Sept. 4, 1956 P. C. WHITENER ET AL 2,761,319

PRESSURE AVERAGING DEVICE

Filed March 15, 1955

INVENTORS
PHILIP C. WHITENER
GORDON H. CHENEY
BY
Reynolds, Beach + Christensen
ATTORNEYS Fig. 3.
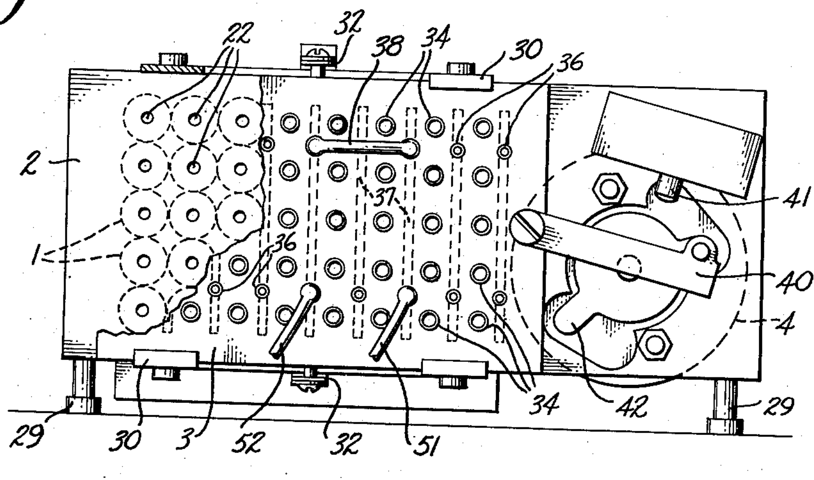
Fig. 4.
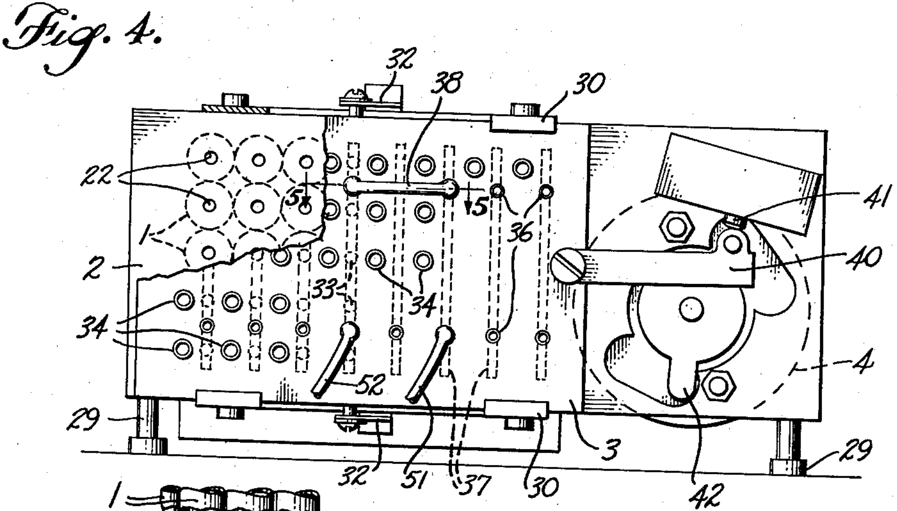
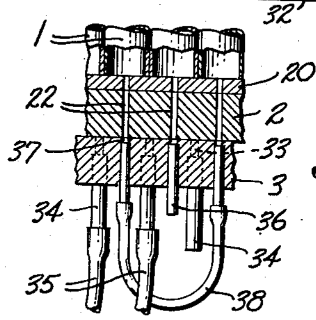
Fig. 5.
INVENTORS
PHILIP C. WHITENER
GORDON H. CHENEY
BY
Reynolds, Beach + Christensen
ATTORNEYS United States Patent Office 2,761,319

Patented Sept. 4, 1956

1

2,761,319

PRESSURE AVERAGING DEVICE

Philip C. Whitener and Gordon H. Cheney, Seattle, Wash., assignors to Boeing Airplane Company, Seattle, Wash., a corporation of Delaware Application March 15, 1955, Serial No. 494,499

6 Claims. (Cl. 73—420)

In wind tunnel tests the pressures in a given zone or along a given line are not always equal. Often it is necessary to sense the pressures at an appreciable number of individual pick-up points, and then to average the pressures at all, or a certain selected group, of those points. Moreover, in such pressure averaging the pressures at the different points must be sensed all substantially simultaneously to avoid error arising from fluctuations in pressure from time to time. The present device has been devised to sample the pressures simultaneously at an appreciable number of points, and thereafter to average quickly and semi-automatically the pressures at all those points, or at certain selected groups of points, without the necessity of any individual readings, recordation, or mathematical computations, and without the possibility of error in the averaging procedure, and to indicate or record the average pressure immediately.

Moreover, there are times when it is desirable to weight pressures of one group as compared to pressures in another group, or to weight the pressures at one point as compared to the other points in a given group. The present invention provides means for accomplishing these ends simply, quickly and accurately.

Since the grouping of the various individual pressure pick-up points, pressures at which are to be averaged, may need to be varied greatly from time to time, the present device is arranged to afford the maximum of flexibility in these respects.

It is also an object to provide a device of the general nature indicated which shall be compact, simple, relatively inexpensive and entirely accurate and dependable in operation, and one which can save many hours of tedious calculation and reading of manometers.

While the device has been described as useful in wind tunnel testing, it will prove equally useful in flight testing, to read and average pressures picked up at various points on the fuselage, wings and control surfaces of an airplane.

It is especially an object of the present invention to enable the sensing and averaging of the pressures and their reading or recording without in any way interrupting or interfering with the test procedures being performed.

With these and other objects in mind, this invention will be more fully understood from a study of the accompanying drawings, wherein the invention is shown in a presently preferred form, and of the following specification, and the novel features wherein the invention resides will be set forth in the appended claims.

Figure 3 is a front elevational view of the device, with parts in what may be designated a first position, and with parts broken away substantially as indicated by the line 3—3 of Figure 1, and Figure 4 is a similar view but with parts shown in what may be termed a second position.

Figure 5 is a detail sectional view as indicated at

2

Figure 1:
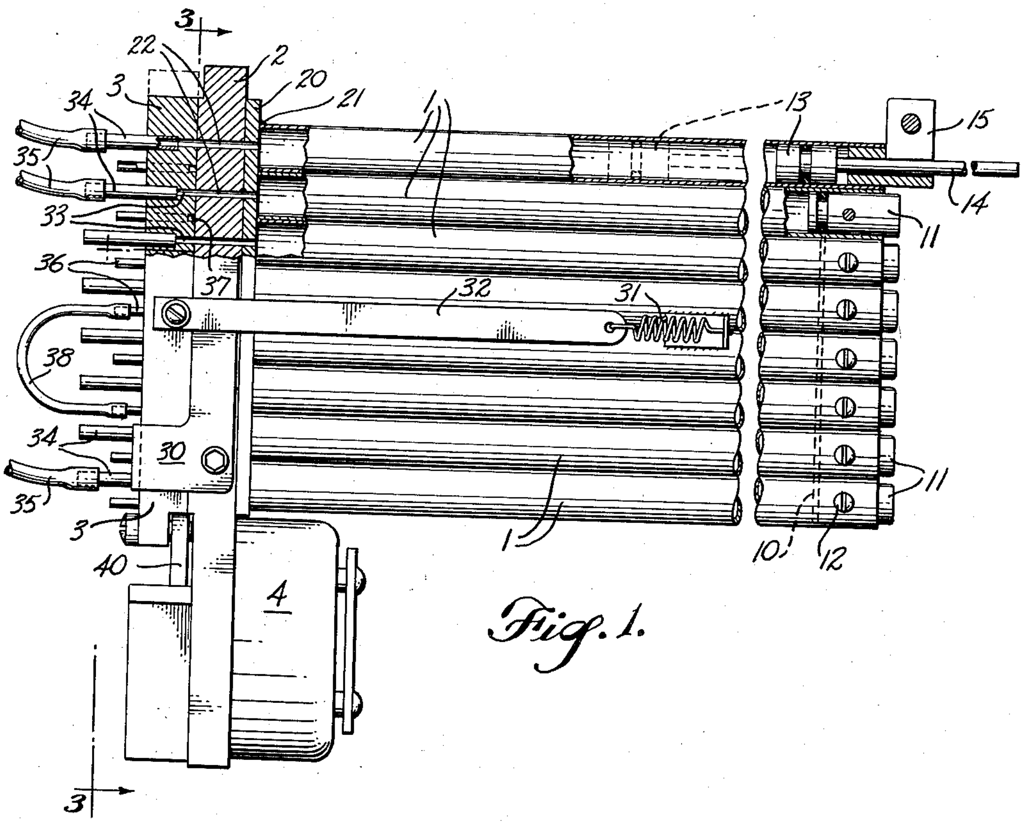
Figure 1 is a plan view, with parts broken away and shown in section, of the device as a whole.
Figure 2:
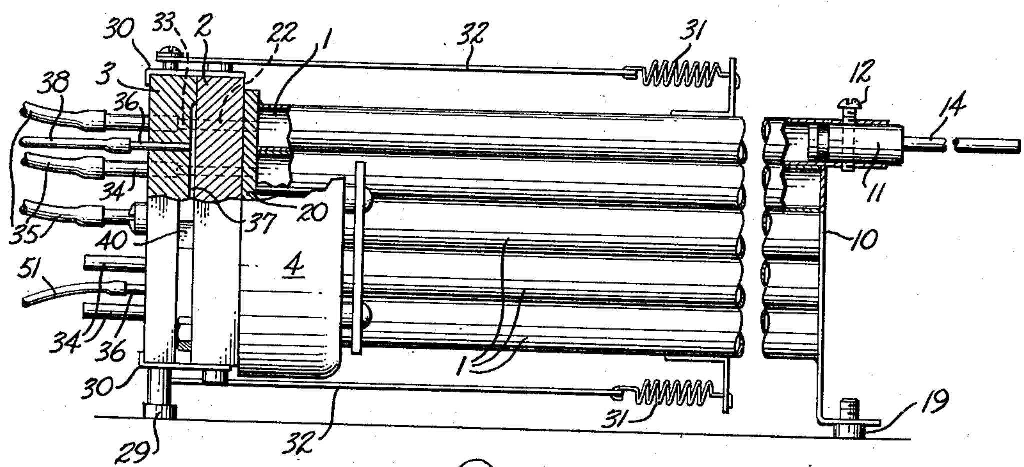
Figure 2 is a similar side elevational view.

5—5 in Figure 4, illustrating two connectors and the conduit interconnecting the same.

In its general aspects, the present invention involves a plurality of chamber of like volume, preferably arranged in groups, and the groups in such relation to one another, that a regular or definite pattern is formed, these chambers being open only by way of through ports arranged in the selected pattern, together with a slide apertured in a similar pattern, and with each aperture connected to an individual pick-up point, seated upon the base plate but shiftable with respect to the base plate so as to bring the slide's apertures each into communication with a single through port and so with the corresponding chamber for admission of pressure from its pick-up point, this being designated the first position, and then by shifting the slide to the second position to close all the chambers and to trap therein a pressure sample, but at the same time to place in communication with the several chambers, or with certain groups thereof, connectors cross-connected by conduit means so as to afford intercommunication between the so connected groups or chambers, whereby the trapped pressure in all so connected is averaged. The so connected chambers or groups of chambers are connected also through other connectors to pressure sensing devices which will immediately read or record the average pressure. Where a weighting of the volume of one chamber, and consequently of its trapped pressure, with relation to other chambers is desired, provision is made for varying the volume of one such chamber, at least, in each group of chambers.

Preferably the chambers are tubular in form, and there are illustrated a plurality of tubular chambers 1 grouped in vertical rows of five as shown herein, and with a number of each rows, eight in the form illustrated, arranged side by side. This permits pressures to be sensed at as many as forty pick-up points. Obviously more or fewer chambers may be provided. One end of each of the chambers 1 is mounted upon a mounting plate 20, as by soldering or brazing as indicated at 21, and this in turn is secured to a base plate 2. The base plate 2 and the mounting plate 20 are ported, the through ports 22 being shown arranged in a pattern corresponding to the pattern of the chambers, and each through port admitting to the interior of its individual chamber 1. The opposite end of the chamber is closed, as for example by sealing the distant end of the tubular chambers 1 to a back plate 10, except that preferably at least one chamber in each row, and as illustrated the uppermost one, is left open, but is sealed by a plug such as the fixed plugs 11 removably secured in place by the set screws 12, or by the slidable plug 13 adjustable lengthwise of the tubular chamber 1 by means of the rod 14 and capable of being held in place by a split clamp 15. The purpose of the rods is to enable the volume of a given chamber in a group to be varied in known relation to the volume of the remaining chambers, thereby weighting the pressure from the corresponding pick-up point relative to pressures at other pick-up points of the same group or of cross-connected groups. The entire assemblage is supported upon a table or other suitable support by any convenient feet, as indicated at 29 and at 19.

A slide 3 is guided in upper and lower guides 30 for sliding transversely across the base plate 2, whereon the slide seats. The mating faces of the slide and base plate may be ground to constitute an effective pressure seal for pressures of the order of those likely to be encountered, and the slide may be pressed firmly to its seat by means such as are indicated by the spring 31 and link 32. The slide is provided with a plurality of apertures 33 arranged in a pattern such that when the slide is in its first position, each aperture 33 will communicate with an individual through port 22. On its outer face, connectors such as the nipples 34 communicate with the several apertures 33 and project outwardly from the slide, for attachment of flexible conduits 35 leading to the individual pressure pick-up points. When the slide is shifted laterally from its first position to its second position, as shown for instance in Figure 1 by the dash lines, its apertures 33 are removed from communication with the through ports 22, but such communication is restored upon shifting of the slide back to its original or first position. Parts are shown in Figure 3 in the first position and in Figure 4 in the second position. Movement between the two such positions might be accomplished manually, but preferably is accomplished by a two-position rotary solenoid device, indicated at 4, connected to the slide 3 by a link 40 and arranged, if desired, to accomplish closure of a limit switch element 41 when parts are in the second position. A stop means is provided at 42 to insure the stoppage of the slide accurately in each of its two positions.

In addition to the apertures 33, the slide is provided with a lesser number of connectors 36, also communicating through to the inner or seated face of the slide. These connectors, however, are so arranged with respect to the apertures 33 that with parts in the first position, the connectors are out of communication with the through ports 22. When parts are in the second position, the connectors 34 are in communication with one or more of the through ports 22. Preferably, the communication of each pair of connectors is with an entire row or group of through ports and chambers, the communication being accomplished by providing the seated face of the slide with vertically disposed grooves 37 connecting the paired connectors 36 and located to line up in the second position of the parts with all the through ports 22 of a given group. Conduit means such as the flexible hose lengths 38 will connect any two or more desired connectors, and when any two such grooves or groups of chambers are thus interconnected, the pressure in all of those chambers is averaged immediately upon effecting the interconnection.

Additional conduit means 51 and 52 are provided for connection to known pressure sensing devices or recording devices (neither of which is shown) by means of which the average pressure desired is sensed and indicated or recorded. While only a single cross connector 38 has been shown, it is clear that any number thereof might be employed, and the interconnections might be made in any desired arrangement. For example, by cross-connecting two or more groups of chambers, and separately cross-connecting two or more different groups, the two average pressures may be observed and compared immediately and directly. The device has extreme flexibility and large capacity.

The device is connected up in advance to accomplish the pressure averaging operation or operations desired to be performed. With parts in the first position of Figure 3, pressure is communicated by means of the individual conduit means 35 to the several individual chambers, which are not preloaded. The slide is then shifted to the second position as in Figure 4, which closes off all those chambers wherein the pressure is not to be read, and cross-connects those wherein the pressures are to be averaged. Simultaneously, the average pressure thus established is imposed through the conduit connections 51 or 52, or both, upon the pressure sensing or recording devices, and the entire operation is performed as quickly as the slide can be shifted from one position to the other, which is substantially instantaneously. No mathematical computations whatever are required. It takes but moments to alter the set-up and arrangement and to take a further pressure-averaged reading. All the while the wind tunnel test or the flight test can continue without interruption.

We claim as our invention:

1. A pressure averaging device of the character described, comprising a base plate having a plurality of through ports arranged in a given pattern, a plurality of closed chambers of like volume each connected to a different one of said ports, a slide seated upon and guided for shifting with respect to said base plate between a first and a second position, said slide having a plurality of inlet apertures corresponding in number and pattern to the through ports, for communicating each with an individual through port and chamber when the slide is in its first position, and to close all said through ports when shifted to its second position, connectors carried by the slide and each located to communicate with a limited number of through ports when the slide is in its second position and with none thereof when the slide is in its first position, conduit means interconnecting selected connectors for intercommunication between the through ports and their chambers which correspond to the selected connectors, and conduit means for connection of a pressure sensing device to the so connected chambers.

2. A pressure averaging device as in claim 1, including means to alter the volume of certain chambers relative to the volume of the remaining chambers.

3. A pressure averaging device as in claim 1, wherein the seated face of the slide is grooved for intercommunication of several chambers in each of several groups, when the slide is in its second position, the connectors being arranged in pairs for communication, each pair with one such groove, for interconnection of selected groups by means of the conduit means.

4. A pressure averaging device of the character described, comprising a plurality of tubular chambers grouped several to a row and several rows arranged in a given pattern, a base plate whereto one end of each chamber is sealed, said base plate having through ports each communicating with the interior of an individual chamber, means closing the distant end of each chamber and enclosing a like volume in each thereof, guide means arranged on said base plate transversely of the rows, a slide guided in said guide means for shifting between a first and a second position, said slide having a plurality of inlet apertures corresponding in number and pattern to the through ports, for communicating each with an individual through port when the slide is in its first position, and to close off all thereof when the slide is shifted to its second position, a plurality of nipples carried by the slide and each communicating with an individual inlet aperture, for the reception of pressure hoses from individual pressure pick-up points, a lesser number of connectors, so positioned that two communicate with each row of chambers when the slide is in its second position, only, conduit means interconnecting selected connectors, and conduit means for connection of the so connected rows of chambers to pressure sensing mechanism.

5. A pressure averaging device as in claim 4, wherein the seated face of the slide is grooved for intercommunication of the several through ports corresponding to a single row of chambers, when the slide is in its second position, the two connectors for that row communicating with that groove.

6. A pressure averaging device as in claim 4, including a plug slidably received in that end of at least one chamber in each row which is distant from the base plate, to vary the volume of such chamber relative to other chambers in the same or in a connected row.

References Cited in the file of this patent

UNITED STATES PATENTS

| | | |
|---|---|---|
| 2,406,192 | Cantrell | Aug. 20, 1946 |
| 2,575,240 | Thompson | Nov. 13, 1951 |
| 2,714,819 | Clark | Aug. 9, 1955 |